United States Patent
Zhao et al.

(10) Patent No.: US 9,306,481 B2
(45) Date of Patent: Apr. 5, 2016

(54) VARIABLE SPEED FAN MOTOR

(71) Applicant: ZHONGSHAN BROAD-OCEAN MOTOR MANUFACTURING CO., LTD., Zhongshan (CN)

(72) Inventors: Yong Zhao, Zhongshan (CN); Yunsheng Chen, Zhongshan (CN)

(73) Assignee: ZHONGSHAN BROAD-OCEAN MOTOR MANUFACTURING CO., LTD., Zhongshan (CN)

( * ) Notice: Subject to any disclaimer, the term of this patent is extended or adjusted under 35 U.S.C. 154(b) by 126 days.

(21) Appl. No.: 14/328,695

(22) Filed: Jul. 10, 2014

(65) Prior Publication Data

US 2015/0091482 A1 Apr. 2, 2015

(30) Foreign Application Priority Data

Sep. 30, 2013 (CN) .................. 2013 2 0614908 U (51) Int. Cl.
*H02P 6/08* (2006.01)
*H02P 6/16* (2006.01)

(52) U.S. Cl.
CPC ......................... *H02P 6/16* (2013.01)

(58) Field of Classification Search
CPC ..... H02P 6/001; H02P 21/141; H02P 21/146; H02P 6/08; H02P 6/187; H02P 27/06; B60L 1/003; B60L 2240/529; H02K 11/0073; H02K 11/0094; H02K 2213/03; H02K 5/10; H02K 5/18; H02K 5/20; H02K 9/04

USPC ................ 318/400.01, 400.03, 400.15, 400.3
See application file for complete search history.

(56) References Cited

U.S. PATENT DOCUMENTS

| | | | | |
|---|---|---|---|---|
| 6,462,494 B1 * | 10/2002 | Schone | ................. | F04D 27/004 |
| | | | | 318/433 |
| 7,504,784 B2 * | 3/2009 | Asada | ................... | D06F 37/304 |
| | | | | 318/400.02 |
| 2008/0180048 A1 * | 7/2008 | Mullin | ..................... | H02P 6/08 |
| | | | | 318/400.26 |

* cited by examiner

*Primary Examiner* — Bentsu Ro
(74) *Attorney, Agent, or Firm* — Matthias Scholl P.C.; Matthias Scholl (57) ABSTRACT

A variable speed fan motor, including a variable speed motor body and a motor controller. The motor controller includes a microprocessor, an inverter circuit, a gear detection circuit, and a power supply. The gear detection circuit includes a plurality of current sensing units. Only one of the power input lines is in an energized state, and remaining power input lines are in a deenergized state. Each power input line is connected to one current sensing unit. An output end of the current sensing unit is connected to an input end of the microprocessor. The microprocessor selects operating parameters of the motor according to a detected signal of energization state of each power input line. The microprocessor is connected to the series communication unit. The microprocessor communicates with an external device via the series communication unit.

9 Claims, 8 Drawing Sheets

VARIABLE SPEED FAN MOTOR

CROSS-REFERENCE TO RELATED APPLICATIONS

Pursuant to 35 U.S.C. §119 and the Paris Convention Treaty, this application claims the benefit of Chinese Patent Application No. 201320614908.2 filed Sep. 30, 2013, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

1. Field of the Invention

The invention relates to a variable speed fan motor.

2. Description of the Related Art

A DC brushless permanent magnetic (BPM) motor is utilized to substitute a permanent-split capacitor (PSC) motor in current HVAC systems, so that advantages of a variable speed fan motor are realized, and it is unnecessary to obviously change the original HVAC system. By using a simple control circuit, the complexity of the system is decreased. However, the current controller of the variable speed fan that substitutes the PSC motor has the following problems:

1) the function is single and not applicable for different workplaces, for example, operating parameters like the supply voltage and the rotational direction cannot be directly set;

2) the reliability is low; as different workplaces impose different requirements on the variable speed fan, work failures or accident easily occur when the control of the variable speed fan is not adaptable to a certain workplace;

3) the state of each power input line is detected by a current transformer and related circuits, however, the current transformer has large volume and high product costs and occupies relatively large space of the motor controller, thereby decreasing the heat dissipation of the motor controller; and 4) a plurality of sensing units of the current transformer are embedded in a wiring plug of the motor, the installation of which is difficult, thereby lowering the production efficiency and being not beneficial for large scale production.

SUMMARY OF THE INVENTION

In view of the above-described problems, it is one objective of the invention to provide a variable speed fan motor that has a simple structure, integrates circuits of different kinds as a whole, and is capable of adapt to different workplaces. The reliability of the variable speed fan motor is improved and the application range thereof is broadened. Furthermore, the variable speed fan motor has relatively small volume, simple layout, and good heat dissipation, and is convenient in connection, thereby being conducive to large scale production.

To achieve the above objective, in accordance with one embodiment of the invention, there is provided a variable speed fan motor, comprising: a variable speed motor body and a motor controller. The motor controller comprises: a microprocessor, an inverter circuit, a gear detection circuit, and a power supply. The gear detection circuit comprises a plurality of current sensing units. An output end of the power supply supplies power to each circuit, and an input end of the power supply is connected to an AC input. The gear detection circuit is connected to a plurality of power input lines; only one of the power input lines is selected to be in an energized state, and the other power input lines are selected to be in a deenergized state. Each power input line is connected to one current sensing unit, respectively. An output end of the current sensing unit is connected to an input end of the microprocessor. The microprocessor selects operating parameters of the motor according to a detected signal of an energization state of each power input line and controls the motor to operate according to selected operating parameters. The microprocessor is connected to a series communication unit. The microprocessor communicates with an external device via the series communication unit.

In a class of this embodiment, an output end of the gear detection circuit is connected to the microprocessor via a filter circuit.

In a class of this embodiment, the filter circuit comprises a plurality of filter circuit units. The output end of each current sensing unit is connected to one filter circuit unit. An output end of the filter circuit unit is connected to the microprocessor.

In a class of this embodiment, the microprocessor is connected to a rotational direction setting circuit. The rotational direction setting circuit is connected or disconnected by a socket terminal The rotational direction setting circuit transmits a control signal to the microprocessor. The microprocessor controls the variable speed motor body to operate in a clockwise direction or a counter clockwise direction via the inverter circuit.

In a class of this embodiment, the power supply comprises an EMI or EMC anti-electromagnetic interference circuit, a rectifier circuit, and a DC-DC conversion circuit. An input end of the EMI or EMC anti-electromagnetic interference circuit is connected to the AC input, and an output end of the EMI or EMC anti-electromagnetic interference circuit is connected to an input end of the rectifier circuit. The rectifier circuit outputs a bus voltage VDC and is connected to the DC-DC conversion circuit. The DC-DC conversion circuit outputs bus voltages +15 V and +5V. The bus voltages VDC, +15 V, and +5V supply power to each circuit. The DC-DC conversion circuit comprises a voltage multiplier circuit. The voltage multiplier circuit is connected or disconnected by a socket terminal to enable the voltage multiplier circuit to be in an original voltage operating state or a voltage-doubling operating state.

In a class of this embodiment, the EMI or EMC anti-electromagnetic interference circuit is connected to the rectifier circuit via a surge current protection circuit. The surge current protection circuit is connected or disconnected under the control of the microprocessor.

In a class of this embodiment, the current sensing unit is a hall current sensing unit.

Advantages according to embodiments of the invention are summarized as follows:

1) The motor controller integrates the gear detection circuit, the series communication unit, the rotational direction setting circuit, the voltage multiplier circuit, and the surge current protection circuit as a whole to enable the variable speed fan to be applicable to different workplaces, to improve the working reliability thereof, and to broaden the application range thereof.

2) The gear detection circuit adopts a plurality of current sensing units to detect the energization state of the power input lines. The gear detection circuit has small volume, connection convenience, low production costs, simple layout, thereby being conducive to large scale production.

3) The microprocessor communicates with the external device via the series communication unit. The structure is simple and the production cost is low. Operating parameters including the rotational direction and the voltage doubling can be set by the series communication unit, thereby being convenient in operation and improving the reliability.

4) The output end of the gear detection circuit is connected to the microprocessor via the filter circuit, so that the current fluctuation at the output end of the gear detection circuit is effectively decreased, and the accuracy and reliability of the detection of the microprocessor are improved.

5) The microprocessor is connected to the rotational direction setting circuit. The rotational direction setting circuit is connected or disconnected by the socket terminal The rotational direction setting circuit transmits the control signal to the microprocessor, and the microprocessor controls the variable speed motor body to operate in the clockwise direction or the counter clockwise direction via the inverter circuit. The structure is simple, and the variable speed motor body can be controlled to operate in the clockwise direction or the counter clockwise direction by using the socket terminal to connect or disconnect the rotational direction setting circuit, thereby simplifying the operation.

6) The DC-DC conversion circuit comprises the voltage multiplier circuit. The voltage multiplier circuit is in the original voltage operating state or the voltage doubling operating state by using the socket terminal to connect or disconnect thereof. The switch between the original voltage operating state and the voltage doubling operating state of the power supply is realized by the socket terminal Thus, the structure is simple, the operation is convenient, and the reliability is improved.

7) The EMI or EMC anti-electromagnetic interference circuit is connected to the rectifier circuit via the surge current protection circuit. The connection or disconnection of the surge current protection circuit is controlled by the microprocessor, thereby being effectively reducing damages of the surge produced from the AC power on the circuit and improving the reliability and the safety.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a variable speed fan motor are described below. It should be noted that the following examples are intended to describe and not to limit the invention.

As shown in FIGS. 1-8, a variable speed fan motor comprises a variable speed motor body and a motor controller. The motor controller comprises: a microprocessor, an inverter, a gear detection circuit, and a power supply. An output end of the power supply supplies power to each circuit. The microprocessor adopts a microcontroller unit (MCU). The inverter circuit adopts an integrated power module (IPM). In the FIGS. 1-8, M represents the variable speed motor body. An input end of the power supply is connected to an AC input. The gear detection circuit is connected to a plurality of power input lines N1, N2, N3, N4, and N5. Only one of the power input lines N1, N2, N3, N4, and N5 is selected to be in an energized state, and the remaining power input lines are in a deenergized state. The gear detection circuit comprises a plurality of current sensing units. Each power input line is connected to one current sensing unit. An output end of the current sensing unit is connected to an input end of the microprocessor. The microprocessor selects operating parameters of the motor according to energization state of each power input line, and controls the variable speed motor body to operate according to selected operating parameters. The microprocessor is further connected to a series communication unit, and the microprocessor communicates with an external device via the series communication unit.

Figure 1:
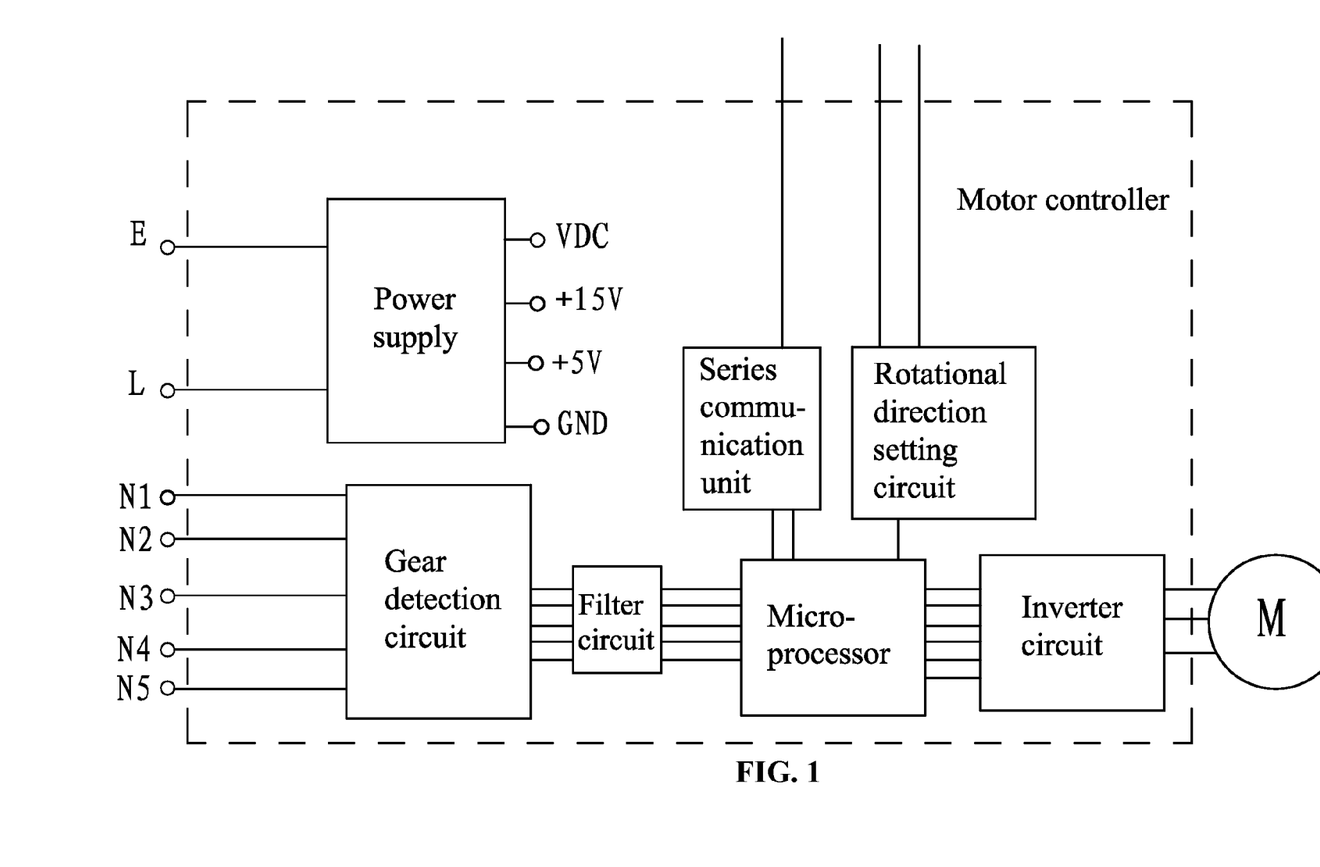
FIG. 1 is a schematic block diagram of a variable speed fan motor in accordance with one embodiment of the invention.
Figure 2:
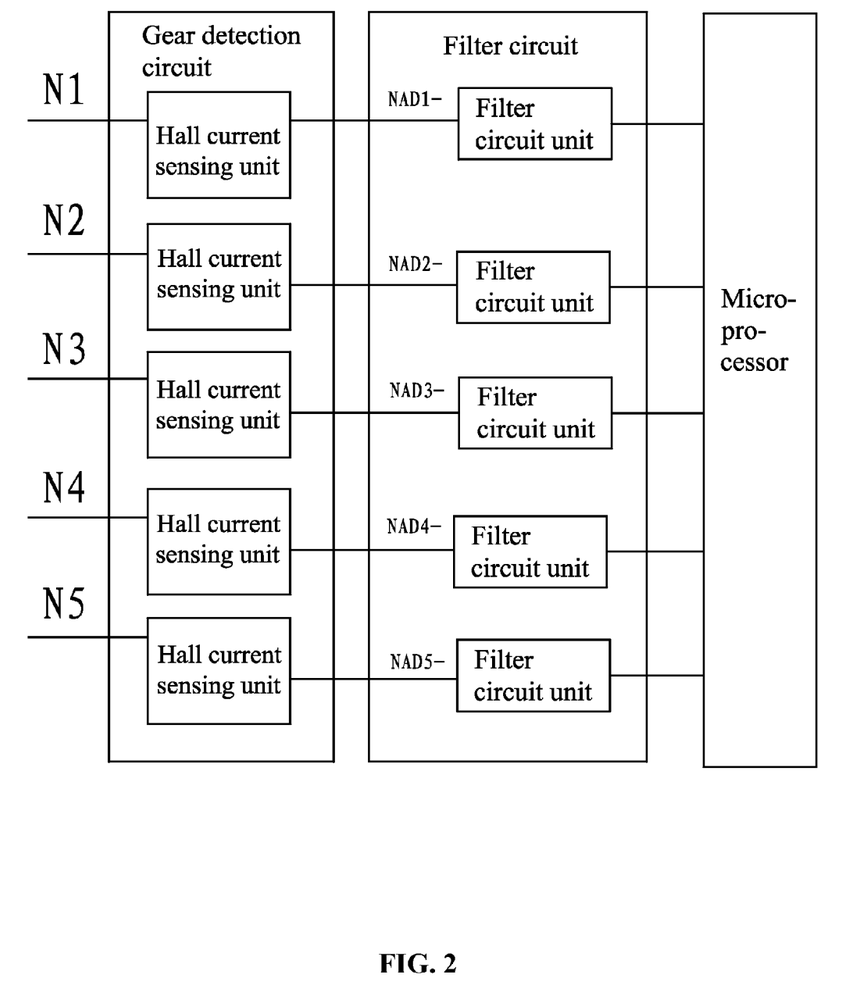
FIG. 2 is a schematic block diagram of a gear detection circuit and a filter circuit in accordance with one embodiment of the invention.
Figure 3:
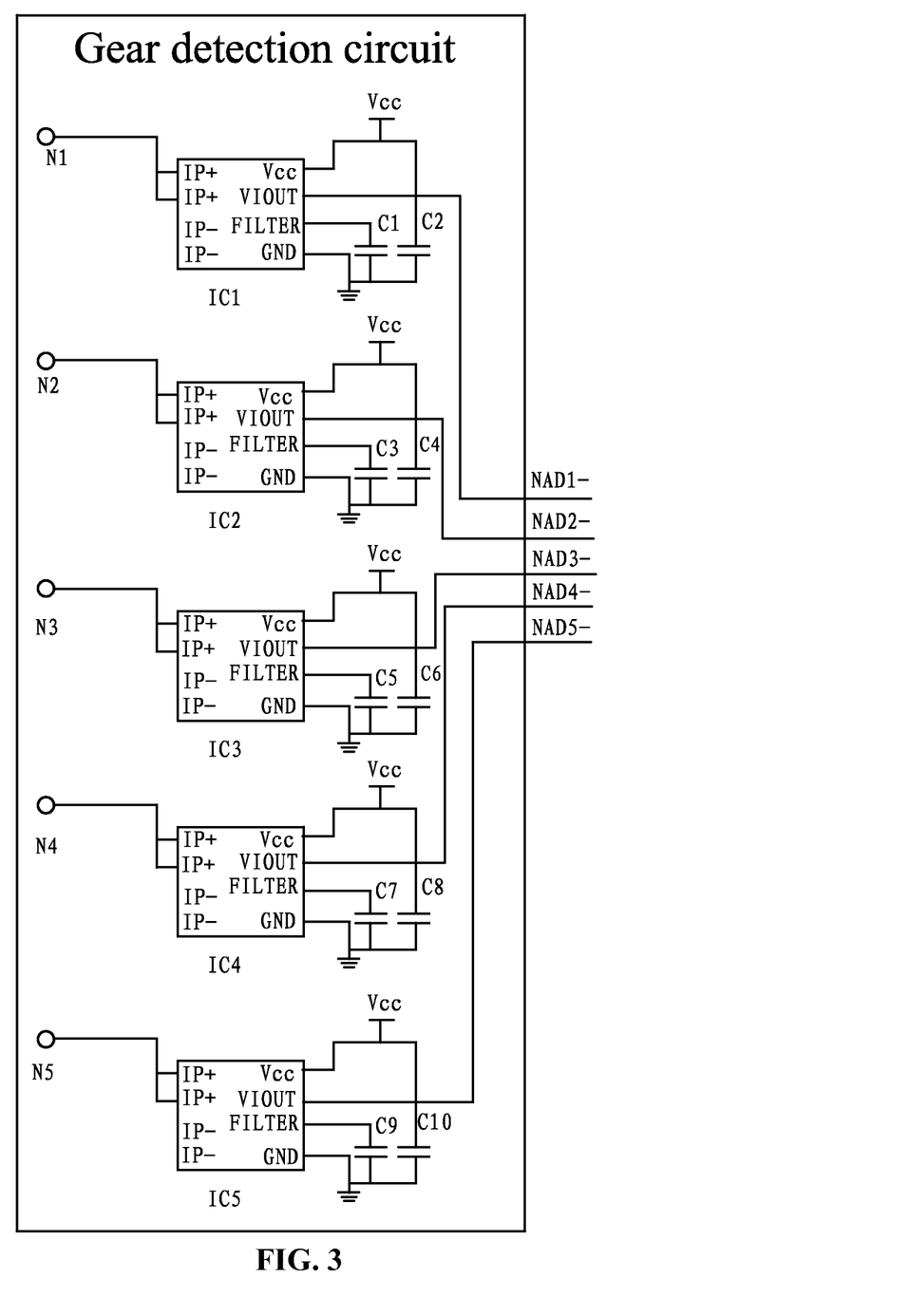
FIG. 3 is a circuit diagram of a gear detection circuit in accordance with one embodiment of the invention.
Figure 4:
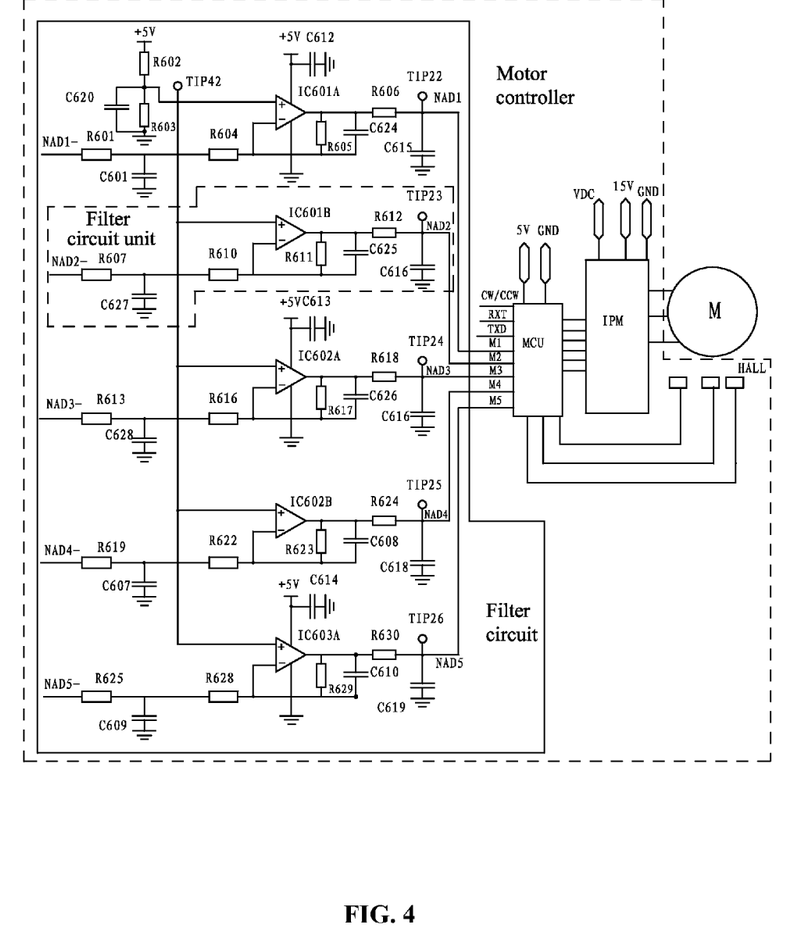
FIG. 4 is a circuit diagram of a filter circuit in accordance with one embodiment of the invention.
Figure 5:
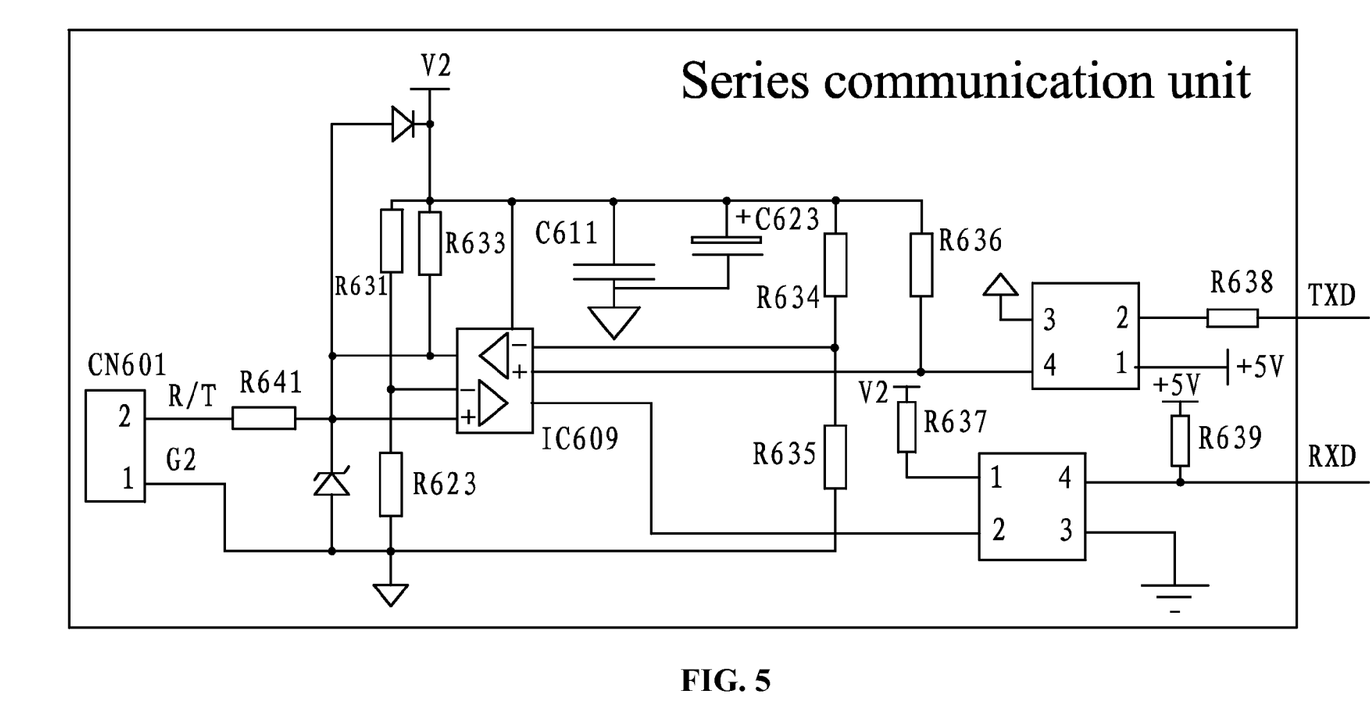
FIG. 5 is a circuit diagram of a series communication circuit in accordance with one embodiment of the invention.
Figure 6:
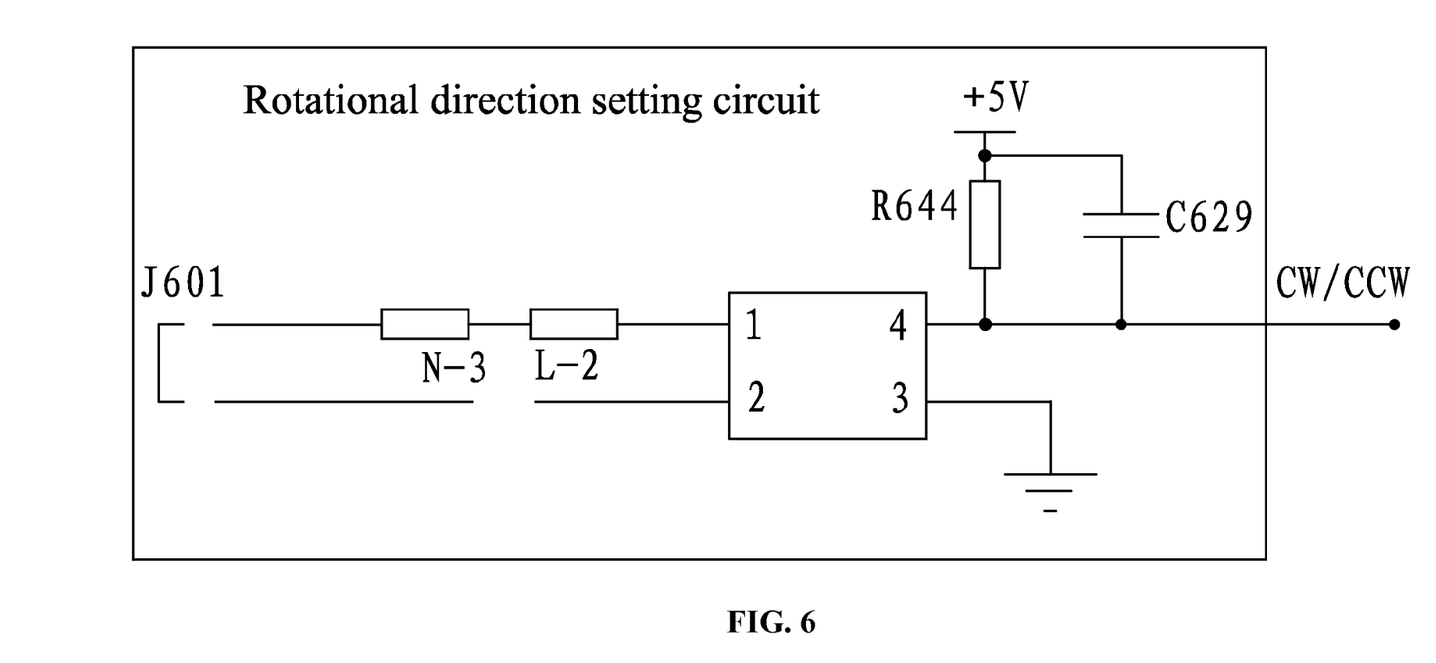
FIG. 6 is a circuit diagram of a rotational direction setting circuit in accordance with one embodiment of the invention.

An output end of the gear detection circuit is connected to the microprocessor via a filter circuit.

As shown in FIGS. 1-2, the filter circuit comprises a plurality of filter circuit units. The output end of each current sensing unit is connected to one filter circuit unit. An output end of the filter circuit unit is connected to the microprocessor.

As shown in FIGS. 1-6, the microprocessor is further connected to a rotational direction setting circuit. A socket terminal J601 is used to connect or disconnect the rotational direction setting circuit. The rotational direction setting circuit sends a control signal to the microprocessor, and the microprocessor controls the variable speed motor body to run in a clockwise direction or a counter clockwise direction.

Figure 7:
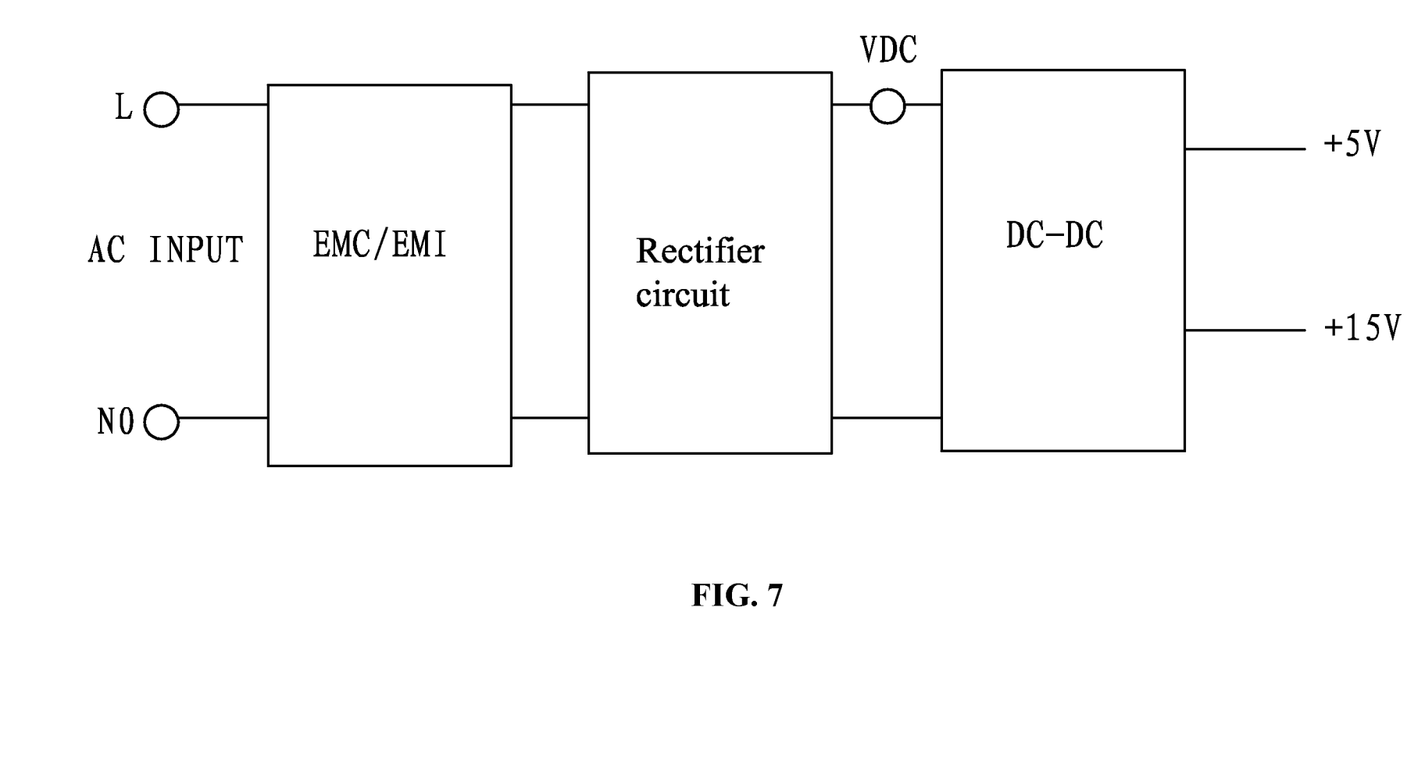
FIG. 7 is a schematic block diagram of a power supply in accordance with one embodiment of the invention.
Figure 8:
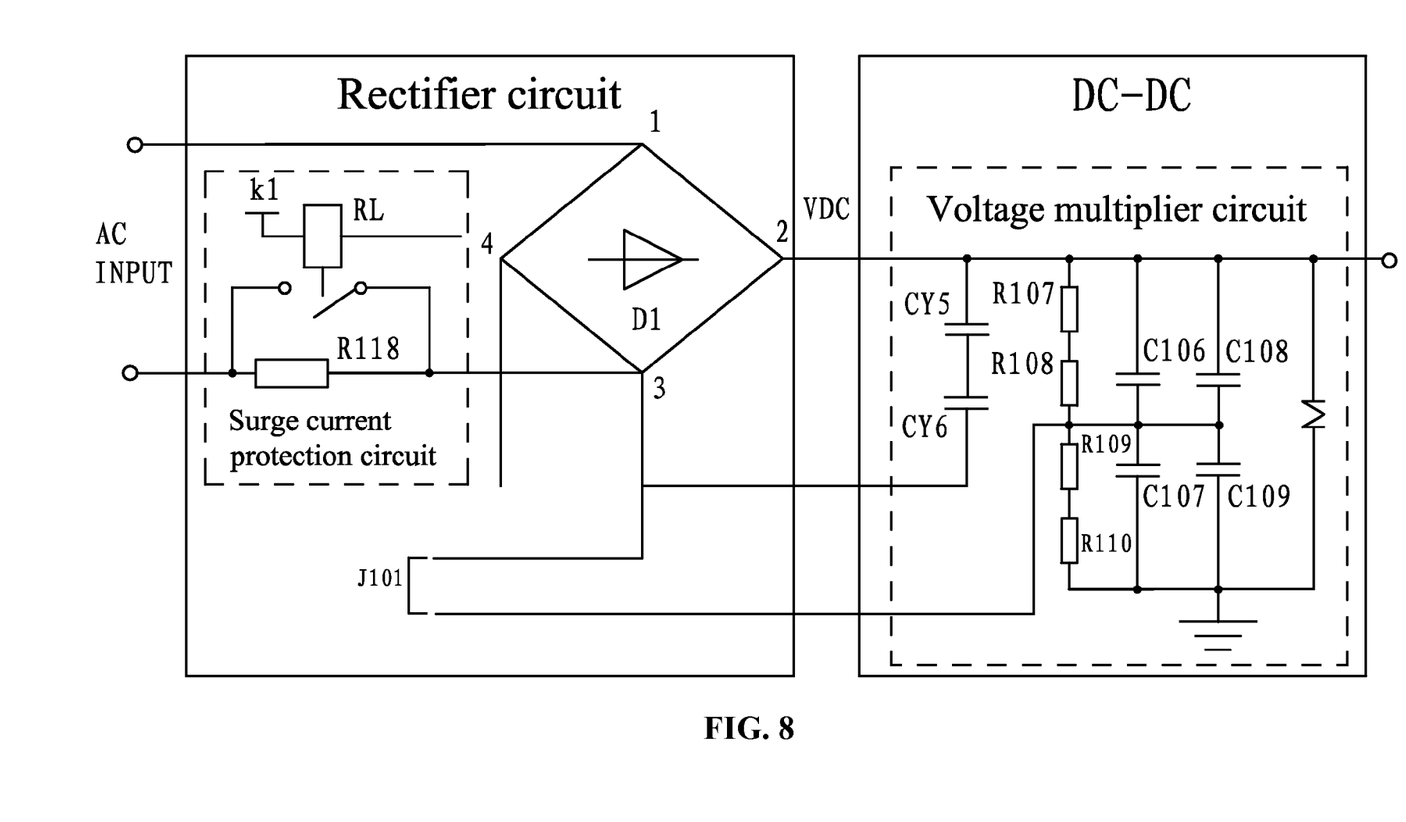
FIG. 8 is a circuit diagram of a rectifier circuit and a DC-DC conversion circuit in accordance with one embodiment of the invention.

As shown in FIGS. 7-8, the power supply comprises an EMI or EMC anti-electromagnetic interference circuit, a rectifier circuit, and a DC-DC conversion circuit. An input end of the EMI or the EMC anti-electromagnetic interference circuit is connected to the AC input. An output end of the EMI or the EMC anti-electromagnetic interference circuit is connected to an input end of the rectifier circuit. The rectifier circuit outputs a bus voltage VDC and is connected to the DC-DC conversion circuit. The DC-DC conversion circuit output outputs bus voltages +15V and +5V. The bus voltages VDC, +15 V, and +5 V are supplied to each circuit. The DC-DC conversion circuit comprises a voltage multiplier circuit. A socket terminal J101 is used to connect or disconnect the multiplier circuit to allow the multiplier circuit to be in an original voltage operating state or in a voltage doubling operating state.

The EMI or the EMC anti-electromagnetic interference circuit is connected to the rectifier circuit via a surge current protection circuit. The surge current protection circuit is controlled by the microprocessor to be connected or disconnected.

The current sensing unit is hall current sensing unit.

Principle of the variable speed fan motor of the invention is as follows: only one of the power input lines N1, N2, N3, N4, and N5 is selected to be in the energized state, and the remaining power input lines are in the deenergized state. Assuming that the power input line N1 is in the energized state and the N2, N3, N4, and N5 are in the deenergized state, the output end of the current sensing unit that is connected to the power input line N1 is connected to the input end of the microprocessor. The microprocessor selects the operating parameters of the motor according to the detected signal of the energized state of the power input line N1 and controls the operation of the variable speed motor body according to the selected operating parameters. The structure is simple and applicable to different workplaces. Different circuits are integrated as a whole for adapting to different workplaces. The working reliability is high and application range is broad. The microprocessor is connected to the series communication unit, by which the microprocessor communicate with the external devices. Thus, the setting of the operating parameters of the microprocessor can be finished by the series communication unit, thereby simplifying the operation and meeting the demands of different workplaces.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A fan motor, comprising:
   a) a variable speed motor body; and
   b) a motor controller, the motor controller comprising: a microprocessor, an inverter circuit, a gear detection circuit, and a power supply; the gear detection circuit comprising a plurality of current sensing units;
   wherein
      an output end of the power supply supplies power to each circuit, and an input end of the power supply is connected to an AC input;
      the gear detection circuit is connected to a plurality of power input lines; only one of the power input lines is selected to be in an energized state, and the other power input lines are selected to be in a deenergized state;
      each power input line is connected to one current sensing unit, respectively;
      an output end of the current sensing unit is connected to an input end of the microprocessor;
      the microprocessor selects operating parameters of the motor according to a detected signal of an energization state of each power input line and controls the motor to operate according to selected operating parameters;
      the microprocessor is connected to a series communication unit; and
      the microprocessor communicates with an external device via the series communication unit.

2. The motor of claim 1, wherein an output end of the gear detection circuit is connected to the microprocessor via a filter circuit.

3. The motor of claim 2, wherein
   the filter circuit comprises a plurality of filter circuit units;
   the output end of each current sensing unit is connected to one filter circuit unit; and
   an output end of the filter circuit unit is connected to the microprocessor.

4. The motor of claim 1, wherein
   the microprocessor is connected to a rotational direction setting circuit;
   the rotational direction setting circuit is connected or disconnected by a socket terminal;
   the rotational direction setting circuit transmits a control signal to the microprocessor; and
   the microprocessor controls the variable speed motor body to operate in a clockwise direction or a counter clockwise direction via the inverter circuit.

5. The motor of claim 2, wherein
   the microprocessor is connected to a rotational direction setting circuit;
   the rotational direction setting circuit is connected or disconnected by a socket terminal;
   the rotational direction setting circuit transmits a control signal to the microprocessor; and
   the microprocessor controls the variable speed motor body to operate in a clockwise direction or a counter clockwise direction via the inverter circuit.

6. The motor of claim 3, wherein
   the microprocessor is connected to a rotational direction setting circuit;
   the rotational direction setting circuit is connected or disconnected by a socket terminal;
   the rotational direction setting circuit transmits a control signal to the microprocessor; and
   the microprocessor controls the variable speed motor body to operate in a clockwise direction or a counter clockwise direction via the inverter circuit.

7. The motor of claim 1, wherein
   the power supply comprises an EMI or EMC anti-electromagnetic interference circuit, a rectifier circuit, and a DC-DC conversion circuit;
   an input end of the EMI or EMC anti-electromagnetic interference circuit is connected to the AC input, and an output end of the EMI or EMC anti-electromagnetic interference circuit is connected to an input end of the rectifier circuit;
   the rectifier circuit outputs a bus voltage VDC and is connected to the DC-DC conversion circuit;
   the DC-DC conversion circuit outputs bus voltages +15 V and +5V;
   the bus voltages VDC, +15 V, and +5V supply power to each circuit;
   the DC-DC conversion circuit comprises a voltage multiplier circuit; and
   the voltage multiplier circuit is connected or disconnected by a socket terminal to enable the voltage multiplier circuit to be in an original voltage operating state or a voltage-doubling operating state.

8. The motor of claim 7, wherein
   the EMI or EMC anti-electromagnetic interference circuit is connected to the rectifier circuit via a surge current protection circuit; and
   the surge current protection circuit is connected or disconnected under the control of the microprocessor.

9. The motor of claim 1, wherein the current sensing unit is a hall current sensing unit.

* * * * *